United States Patent [19]

Miller et al.

[11] Patent Number: 5,511,730
[45] Date of Patent: Apr. 30, 1996

[54] INSULATION BLOWER HAVING HANDS-FREE METERED FEEDING

[76] Inventors: Michael W. Miller, 9920 N. 100 W., Markle, Ind. 46770; Kerry W. Miller, 404 W. Central Ave., Bluffton, Ind. 46714

[21] Appl. No.: 245,765

[22] Filed: May 18, 1994

[51] Int. Cl.⁶ .......................... B02C 13/286; B02C 18/22; B02C 23/18
[52] U.S. Cl. ........................ 241/57; 241/60; 241/101.4; 241/101.8; 241/162; 406/63; 406/66; 406/67; 406/68
[58] Field of Search .................................. 222/236, 239, 222/242, 636; 406/63, 65, 66, 67, 68; 241/57, 60, 62, 101.78, 101.2, 101.4, 101.8, 152.2, 162, 199.12, 225, 277, 282.1, 282.2, 605

[56] References Cited

U.S. PATENT DOCUMENTS

| | | | |
|---|---|---|---|
| 1,568,139 | 1/1926 | Dewey | 406/66 |
| 2,193,849 | 3/1940 | Whitfield | 406/63 X |
| 2,262,094 | 11/1941 | Burt | 406/66 |
| 2,665,852 | 1/1954 | Shively | 241/92 |
| 2,793,083 | 5/1957 | Oetiker | 302/35 |
| 4,025,122 | 5/1977 | Diemert | 406/63 |
| 4,376,600 | 3/1983 | Egli | 222/242 X |
| 4,560,307 | 12/1985 | Deitesfeld | 222/317 X |
| 4,599,015 | 7/1986 | Krambroch | 406/66 |
| 4,640,467 | 2/1987 | Takeuchi | 241/282.1 X |
| 4,661,024 | 4/1987 | Hafner | 406/63 |
| 5,071,289 | 12/1991 | Spivak | 406/11 |

Primary Examiner—Timothy V. Eley
Attorney, Agent, or Firm—Woodard, Emhardt, Naughton, Moriarty & McNett

[57] ABSTRACT

The thermal insulation blower of the present invention is built around a vertically oriented air lock system. The insulation blower is capable of being configured for high delivery rates suitable for open area blowing and is capable of being reconfigured for lower delivery rates as a through-the-blower system for closed area blowing operations. The insulation blower includes a metering feeder assembly which can be adjusted to control the rate at which a bale of insulation is ripped and fed into the air lock system. The thermal insulation blower of the present invention also includes a bypass system around the air lock which serves to automatically clear impending plugs of insulation material in the delivery hose.

21 Claims, 6 Drawing Sheets

5,511,730

INSULATION BLOWER HAVING HANDS-FREE METERED FEEDING

BACKGROUND OF THE INVENTION

The present invention relates generally to loose fill thermal insulation blowers, and in particular to a vertically oriented air lock type system with means for metering the rate at which pieces of thermal insulation are fed to the air lock.

Loose fill thermal insulation blowers in use today generally fall into one of two categories, through-the-blower systems and air lock systems. In through-the-blower systems, the insulation bale must normally be torn apart by hand and then further ripped into relatively small pieces by agitating knives or fingers that are powered by the apparatus. The thermal insulation pieces are then fed into the suction side of a high-speed (10,000 rpm) centrifugal blower. The delivery of the thermal insulation material to the desired location is accomplished via a flexible hose connected to the outlet of the blower apparatus. The rate of delivery of insulation for through-the-blower systems is generally controlled by the size of the blower, the centrifugal impeller design, the amount of air allowed to enter at the suction air gate, and/or the amount of insulation allowed to enter at the suction material gate.

Such systems are normally very adaptable to different blowing situations such as attic blowing, wall cavity blowing, and wet adhesive spraying of insulation onto a freestanding surface; however, through-the-blower systems suffer from a number of disadvantages, not the least of which is that the system is generally maintenance intensive and requires relatively large amounts of power to operate. Because all delivered material must go through the centrifugal impeller of the blower, an operator may inadvertently feed rocks, dirt, metal particles, cloth, etc. which can potentially do extensive damage to the impeller. Even if no foreign material is introduced to the system, the wear of the impeller is rapid and a continual maintenance concern. Finally, through-the-blower systems simply cannot achieve the high delivery rates of insulation required by many users, such as by commercial contractors.

In air lock systems, the insulation bale is also first torn apart by hand, then further ripped apart by agitating knives or fingers, and finally is fed into a rotating air lock. The pressure side of the blower is connected to one side of the air lock, and a flexible delivery hose is connected to the other side to deliver the insulation to the desired location. The rate of delivery of insulation in air lock systems is generally controlled by changing the speed of rotation of the air lock, changing the speed of the blower, and/or by adjusting the amount of insulation material allowed to enter the air lock through the material gate. These systems usually have the capability of high delivery rates, which can be as high as 3,000 pounds of insulation per hour. However, air lock systems in present use do not generally adapt well to blowing in enclosed spaces, such as wall cavities, because the required small diameter delivery nozzle places too tight a restriction on the system. It is also difficult in air lock systems to deliver the required three pounds per cubic foot of packed density that is necessary in order to prevent insulation settling within the wall cavity. Air lock systems are also usually relatively heavy, are not very portable and generally have high initial costs. Insulation blow density for open insulation blowing, such as in attic spaces, is generally not as good as through-the-blower systems because the material is not being fluffed by the high velocity impeller of a blower.

What is needed is a low-weight thermal insulation blower that is sufficiently portable to easily fit through a standard doorway, has relatively low power requirements at full load conditions, requires no hand shredding, has the capability to deliver high material rates, and has the flexibility to work equally well in closed blowing situations, such as into walls, and opening attic-type blowing situations.

SUMMARY OF THE INVENTION

The present invention responds to this need by providing a hybrid air lock-type thermal insulation blower that has the flexibility to be configured for open blowing situations and reconfigured as a through-the-blower system for closed blowing situations. Unlike air lock systems of the prior art, the present invention uses a vertically oriented air lock rather than the horizontally oriented air lock systems of the prior art. A motor simultaneously rotates the chamber wheel of the air lock system and a bale stripper that is adjustable to meter the rate at which pieces of insulation are fed to the rotating chamber wheel. The rotating bale stripper also has a hands-free design such that a user need only feed whole bales of insulation, without its outer plastic wrapper, into the apparatus, which automatically rips the bale into pieces at a controlled rate.

The stripper performs the dual purpose of stripping material off the bottom of the bale as the bale feeds downward and metering the rate at which the insulation pieces are allowed to fall into the rotating chambers. A center post feeder is a prime player in this metering process. The center post feeder is positioned above the stripper and rotates therewith. The angle of the center post feeder with respect to the stripper controls the feed rate of the bale onto the stripper because the weight of the bale is supported until the feeder arm eats up through the bale. The angle of the center post feeder determines how fast tile ripping and metered feeding occur. In addition, tile height of the center post feeder from the stripper also affects the feed rate. The closer the center post feeder is to the stripper, the slower the feed rate.

One object of the present invention is to provide an improved loose-filled thermal insulation blower.

Another object of the present invention is to provide a relatively low weight blower apparatus that is sufficiently portable to fit easily through standard doorways.

Still another object of the present invention is to provide a thermal insulation blower that has low power requirements and is capable of relatively hands-free operation.

Still another object of the present invention is to provide a thermal insulation blower that has the flexibility to operate efficiently in both closed and open-type blowing situations.

Other objects and advantages of the present invention will become apparent from the following description.

DESCRIPTION OF THE PREFERRED EMBODIMENT

Figure 1:
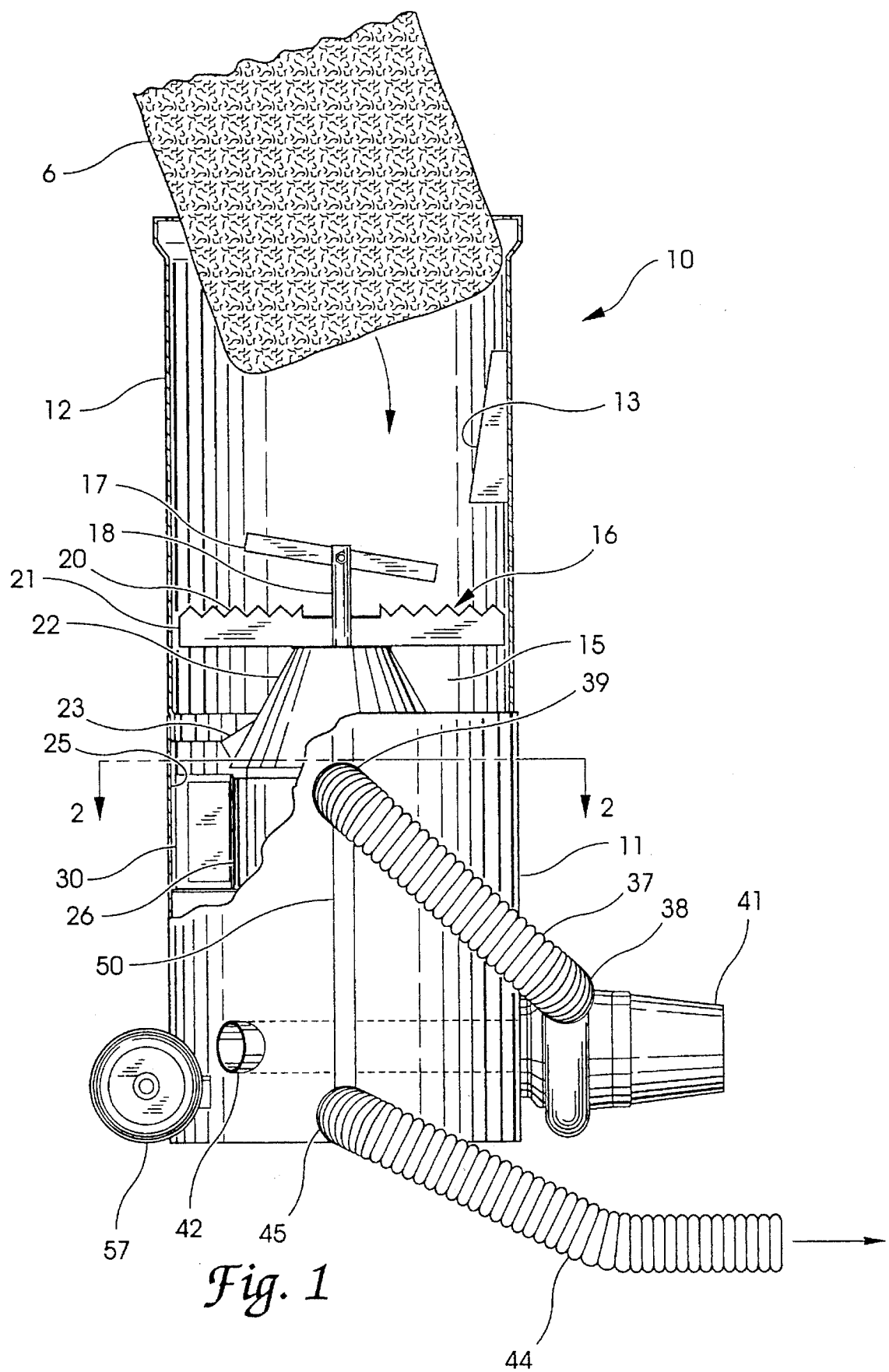
FIG. 1 is a partially sectioned side elevational view of a thermal insulation blower according to the present invention hat is configured for open air blowing situations.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1–4, a thermal insulation blower 10 according to the present invention includes a base frame 11 upon which is removably mounted a hopper 12. Both the base frame and the hopper are generally cylindrical in shape with a diameter just larger than that of a typical bale of thermal insulation 6 such that stationary vane 13 is able to prevent the bale from rotating after being loaded into the hopper. Once within the hopper, the bale of thermal insulation 6 rests upon center post feeder bar 17, whereupon no further action need be taken by the person loading insulation bales into the machine. When blower 10 is turned on, a gear motor 61 (FIGS. 3 and 4), simultaneously rotates the chamber wheel 26 and metering feeder assembly 16 via a vertical axle 59. Center post feeder bar 17 then "eats" up through the center of the insulation bale 6 while stationary vane 13 keeps the bale from rotating. This allows the bale to come into contact via gravity action with stripper members 20, which peel pieces of insulation off the bottom of the bale. Some pieces then fall by gravity directly into chambers 29 (FIG. 2) of rotating chamber wheel 26, while other pieces fall onto feed cone 22 where they are directed toward chambers 29 with the help of agitation vanes 23. The rate at which the bale is fed onto the top serrated edges 21 of stripper members 20 is controlled by the angle θ of center post feeder bar 17 with respect to the horizontal. An angle θ of about 6 degrees has been found to be acceptable for most types of insulation bales.

Figure 2:
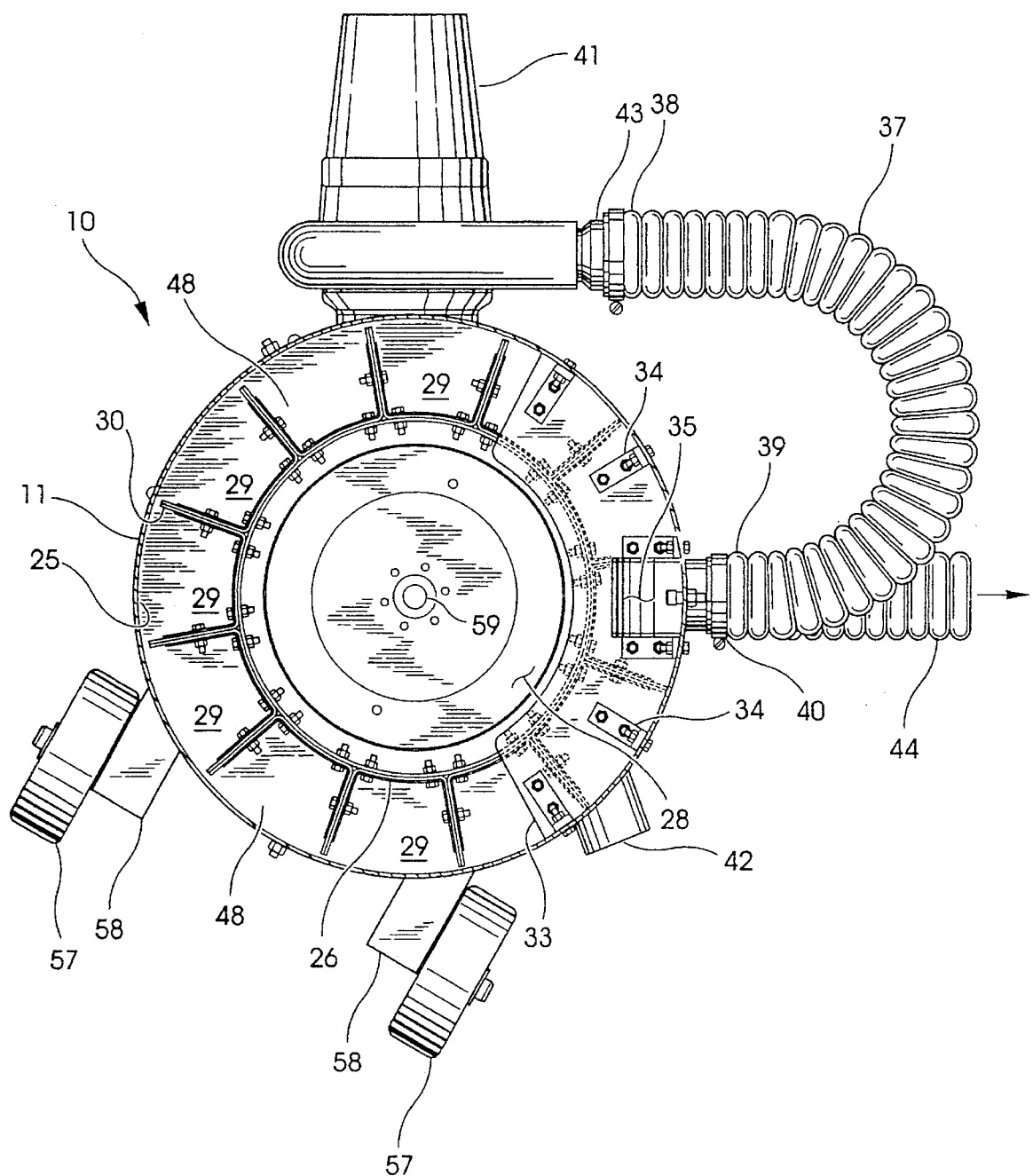
FIG. 2 is a top sectioned view through the insulation blower of FIG. 1 as viewed along the section arrows 2—2.

As best seen in FIG. 2, rotating chamber wheel 26 consists of 12 equally sized chambers 29 that are distributed around the periphery thereof. Chambers 29 pass consecutively through a stationary air lock as the chamber wheel rotates. The stationary air lock is made up of an air lock ceiling 33 and an air lock floor 48, which completely divides base frame 11 into an upper portion and a lower portion. As each consecutive chamber 29 rotates into registry with the air lock, the insulation pieces carried therein are either pulled or blown from the chamber via air lock opening 32 in ceiling 33 and lower air lock opening 49 in floor 48 (see FIG. 3). Air lock ceiling 33 is sized so that approximately 75% of the chambers 29 are always exposed to falling pieces of insulation from stripper members 20. This is in stark contrast to the horizontally oriented machines of the prior art that only permit a single chamber to be fully exposed to the falling material at one time.

One advantage of multiple exposure is that a chamber positioned approximately 180° from openings 32 and 49 can be used to precisely set all machine variables for maximum efficiency. Maximum insulation delivery rate with the least energy occurs when the chambers 29 are filled approximately 180° from the air lock openings 32 and 49. Adjustment to achieve this optimum efficiency can be accomplished by changing the angle θ of centerpost feeder bar 17, by changing the rotation rate of chamber wheel 26, or by changing the blower speed of blower 41. Another advantage of the present multiple chamber exposure design over the single exposure horizontal air locks of the prior art is that the whole system can operate at lower speeds since there is more time for each chamber 29 to fill. This results in less energy input being required by blower apparatus 10. Still another advantage of multiple chamber exposure is that it lends itself to a more compact design which is beneficial in keeping overall weight and size of the machine to a minimum.

In order to further reduce the power requirements for insulation blower 10, gear motor 61 and its vertical drive shaft 59 are mounted to the underside of tile air lock floor 48 a small offset distance from the geometric center of base frame 11 in the direction of the air lock openings 32 and 49. This results in chamber gaskets 30 of chambers 29 creating friction drag only when the chamber is passing under air lock ceiling 33. In other words, gaskets 30 remain slightly out of contact with the inner wall 25 of base frame 11 through most of the chamber's rotation path. Not only does this offset mounting lower the overall energy required for the machine, but it also reduces gasket wear on chamber gaskets 30, which lowers long-term maintenance costs by increasing the operational lifetime of the gaskets.

Figure 3:
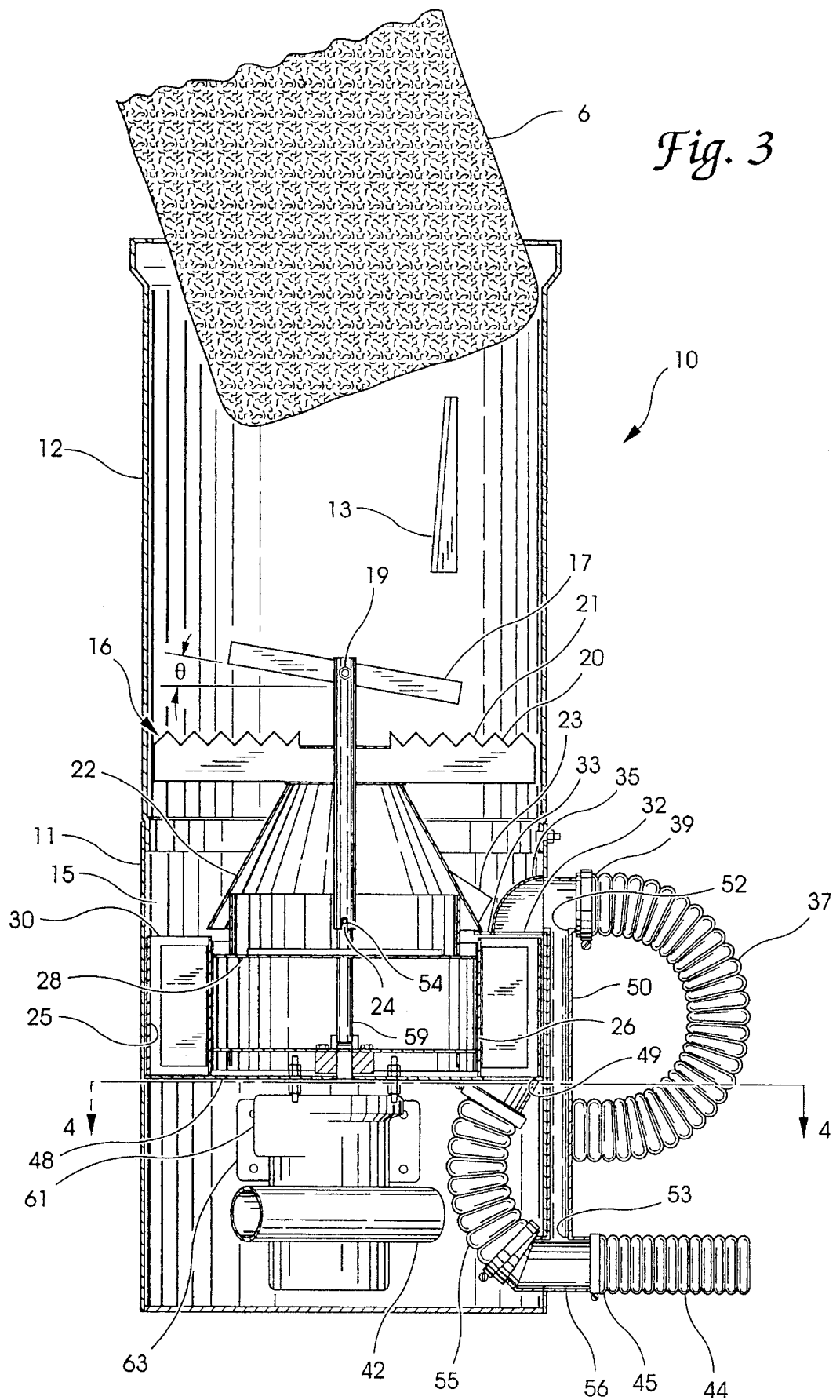
FIG. 3 is a sectioned front elevational view of the thermal insulation blower of FIG. 1.
Figure 5:
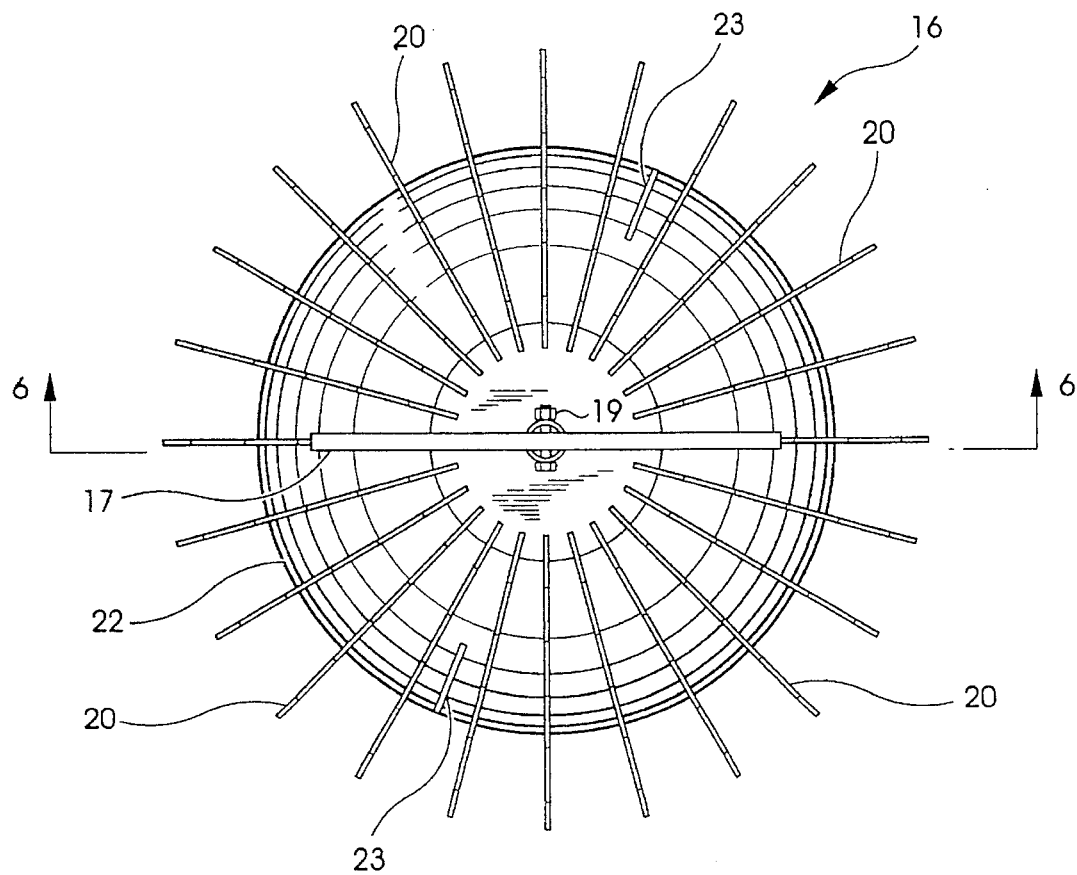
FIG. 5 is a top view of the metering feeder assembly according to one aspect of the present invention.
Figure 6:
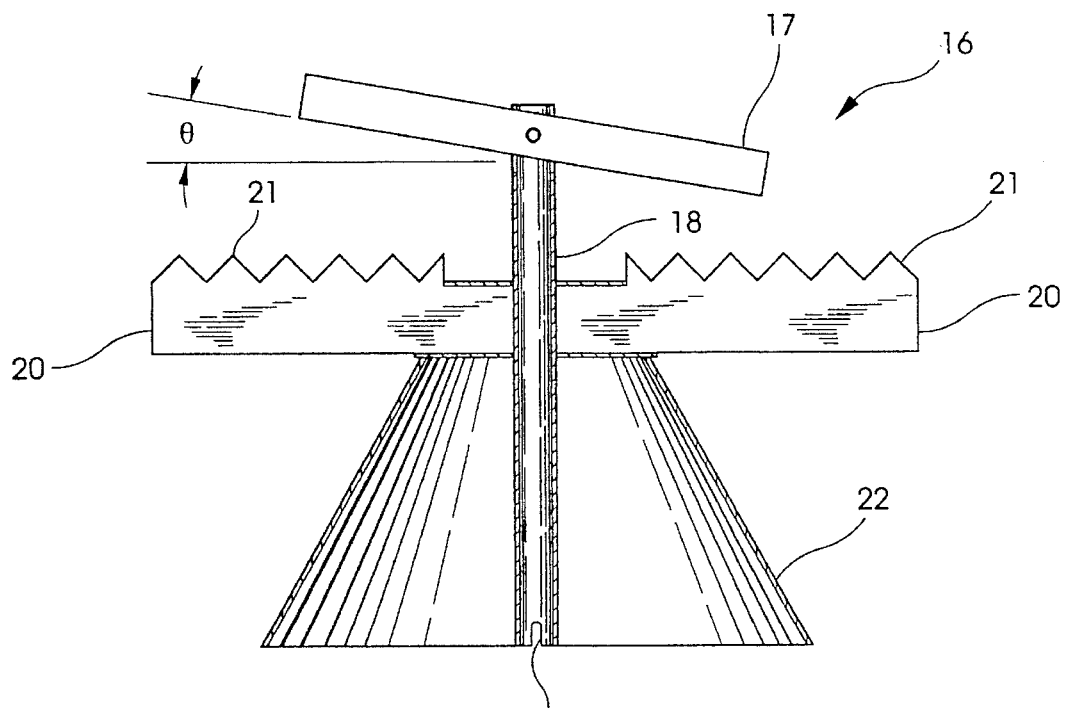
FIG. 6 is a side sectioned view of the metering feeder assembly of FIG. 5 as viewed along section arrows 6—6.

In order for a multiple exposure air lock to work, it is mandatory that the insulation bale be metered into the falling space 15 (FIGS. 1 and 3) between stripper members 20 and rotating chamber wheel 26. For example, if too little material is metered to rotating chamber wheel 26, the unit will not be able to deliver enough thermal insulation material. If too much material is metered into falling space 15, the insulation pieces tend to become overly packed which often results in bridging problems and/or plugging problems that also serve to reduce delivery outputs. The present invention accomplishes correct metering through the unique design of metering feeder assembly 16 as shown best in FIGS. 5 and 6. First, the angle θ of centerpost feeder bar 17 controls the maximum downfeed rate of insulation bale 6. The greater the angle θ, the greater the feed rate of the bale onto stripper members 20. Stripper members 20 comprise a plurality of radial arms which protrude from a common hub 18, with each stripper member having a serrated upper edge 21. The radial arms have a maximum separation distance at their radial extremes of approximately 2 to 2½ inches. Thus, relatively larger pieces of insulation having a diameter greater than the separation distance between the stripper members 20 are unable to pass through the stripper until being torn into even smaller pieces. In the preferred embodiment, the angle θ of centerpost feeder bar 17 can be adjusted for maximum efficiency via nut and bolt 19, as shown in FIG. 5. Metering feeder assembly 16 is preferably welded together as a single unit, except for the adjustable attachment of centerpost feeder bar 17. The assembly is also preferably removable from the machine to better facilitate cleaning in the area around rotating chamber wheel 26. Vertical shaft 18 of the assembly includes a drive slot 24 which meshes with a transverse drive pin 54 that is attached to vertical drive shaft 59 as shown in FIG. 3.

FIGS. 1–4 show the thermal insulation blower 10 configured for high flow rates suitable for open area blowing, such as in attic spaces. In this mode of operation, blower 41 draws in ambient air through blower intake tube 42. The exit of the blower is attached to the first end 38 of transfer tube 37. The other end 39 of the transfer tube is connected to corner conduit 35 via an ordinary hose clamp. Transfer tube 37 is preferably made from 2½ inch diameter flexible hose. Corner conduit 35 opens to the rotating chambers 29 via air lock opening 32 in air lock ceiling 33. The air pressure produced by blower 41 blows the insulation in each consecutive chamber 29 downward through air lock opening 49 in floor 48 and then into internal conduit 55. The source end 45 of delivery hose 44 is then connected to internal conduit 55.

A portion of the air from blower 41 is directed around the air lock via clean air tube 50 directly to the exit 56 of internal conduit 55. Clean air tube 50 is preferably square in shape and is welded directly to the side of base frame 11 between corner conduit 35 and the exit portion 56 of internal conduit 55. Thus a portion of the air coming from blower 41 enters opening 52 and travels through clean air tube 50 exiting at opening 53 to rejoin the main airflow into delivery hose 44. Since the delivery rates of the present invention are so high, clean air tube 50 is required to prevent plugging in the delivery hose 44. With the main conduits being on the order of about 2½ inches in diameter, the clean air tube must have a diameter on the order of ½ to ¾ inch in diameter to be effective. When a plug in the delivery lose begins to develop, the pressure drop across the clean air tube increases so that more "clean air" is automatically directed around the air lock and into the delivery hose to clear the impending plug.

An alternative but more expensive solution to clearing impending plugs in the delivery hose would be to provide a pressure activated valve in the clean air tube. In this way, when the pressure began to rise due to an impending plug, the pressure activated valve in the clean air tube would open to allow clean air to pass through the clean air tube to clear the plug with a burst of more air. The pressure activated valve would preferably be biased closed so that when no impending plug was present, the full air flow rate would pass through the air lock resulting in a more complete clean out of the chambers passing through the air lock, which has the potential to produce even higher delivery rates.

Figure 7:
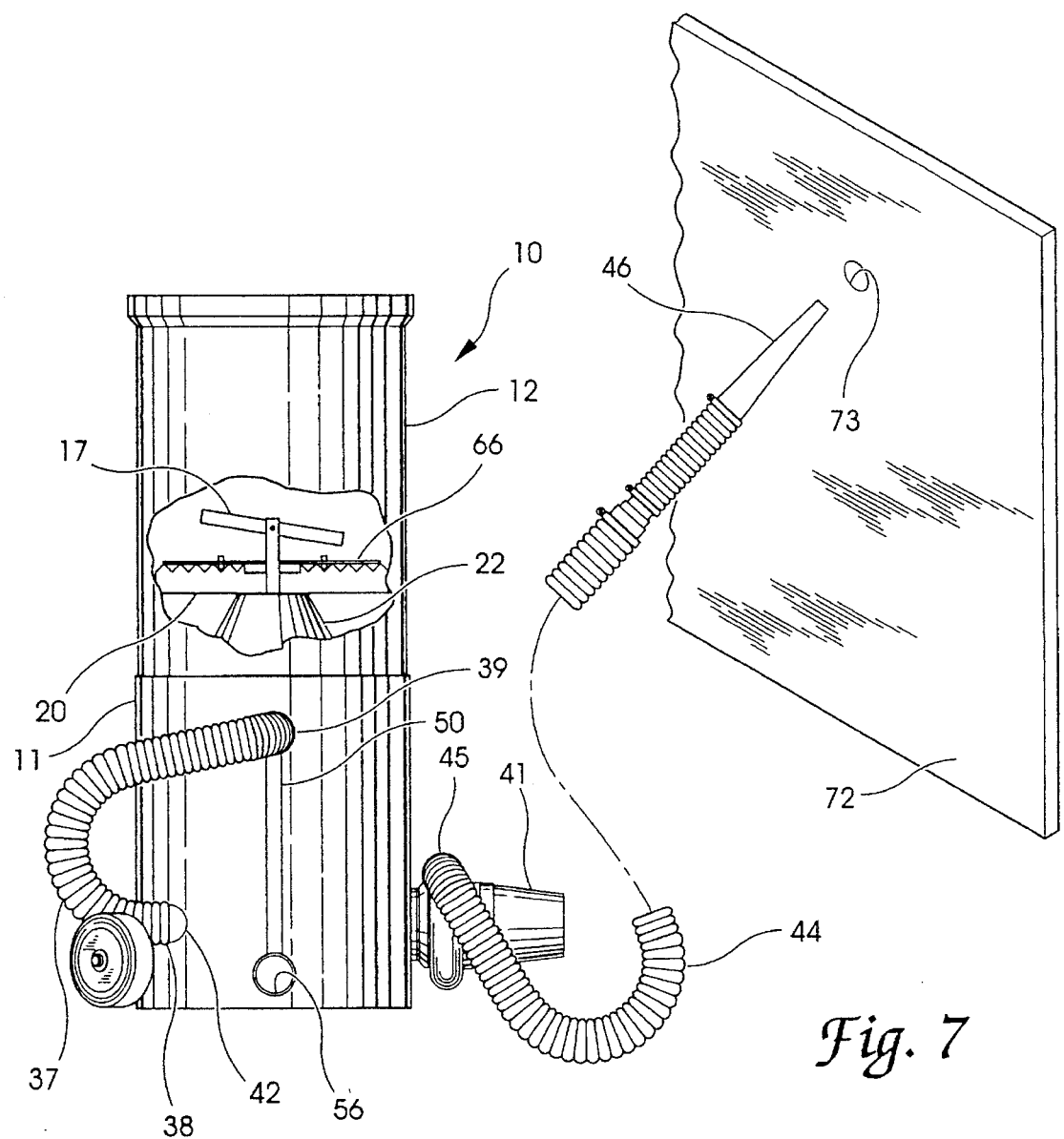
FIG. 7 is a side elevational view of the thermal insulation blower of FIGS. 1–4 after being reconfigured for closed area blowing.
Figure 8:
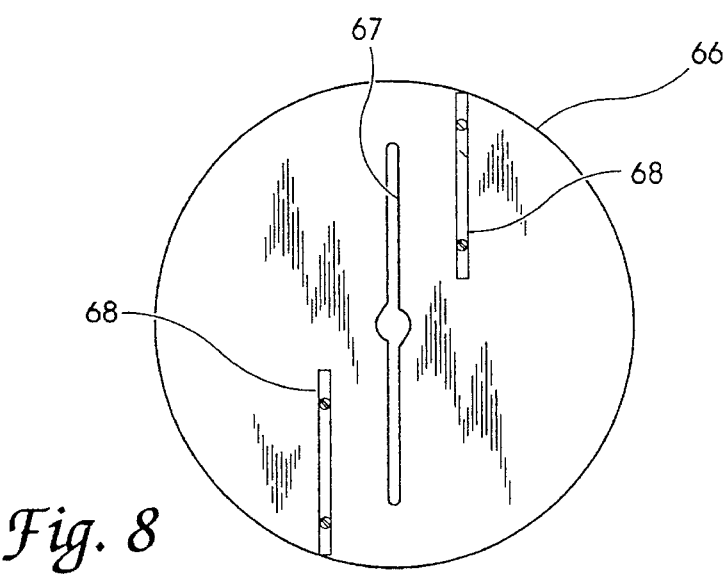
FIG. 8 is a top view of a wall blow block plate accessory according to another aspect of the present invention.

When it is desired to blow insulation into a closed area, such as for example into a wall cavity, the insulation blower 10 is reconfigured as shown in FIG. 7. In this configuration, a wall blow block plate 66 is laid atop stripper members 20 to restrict the flow rate to about 300 pounds per hour or less. Block plate 66 includes an elongated slot 67 which allows it to be placed over centerpost feeder bar 17, and also includes a pair of low profile projections 68 which cause the block plate to rotate with stripper members 20 so as not to dull the serrated edges 21. In this configuration, delivery hose 44 includes a relatively small diameter nozzle 46 which is capable of being inserted in a relatively small hole 73 in a wall 72. In this configuration, the source end 45 of delivery hose 44 is connected to the exit of blower 41 so that the apparatus now operates as a through-the-blower system to fluff the insulation as it passes through the blower.

Recalling that in the open blowing configuration of FIGS. 1–4, delivery hose 44 was attached to the exit opening 56 of internal conduit 55 instead of directly to the blower as in the closed area configuration of FIG. 7. Another important difference in the closed area configuration is that one end 38 of transfer tube 37 is connected to blower intake tube 42. Thus, in the closed area configuration of FIG. 7 ambient air is drawn in through opening 56 where a portion of the air travels directly through clean air conduit 50 to transfer tube 37 and the remainder of the air travels upward via internal conduit 55 through the air lock to carry the insulation material to transfer tube 37. The insulation material is then pulled through blower intake tube 42, through blower 41 and then into delivery hose 44. In this configuration, the insulation blower 10 operates at a significantly lower flow rate but with all of the advantages of both an air lock system and a through-the-blower system.

Figure 4:
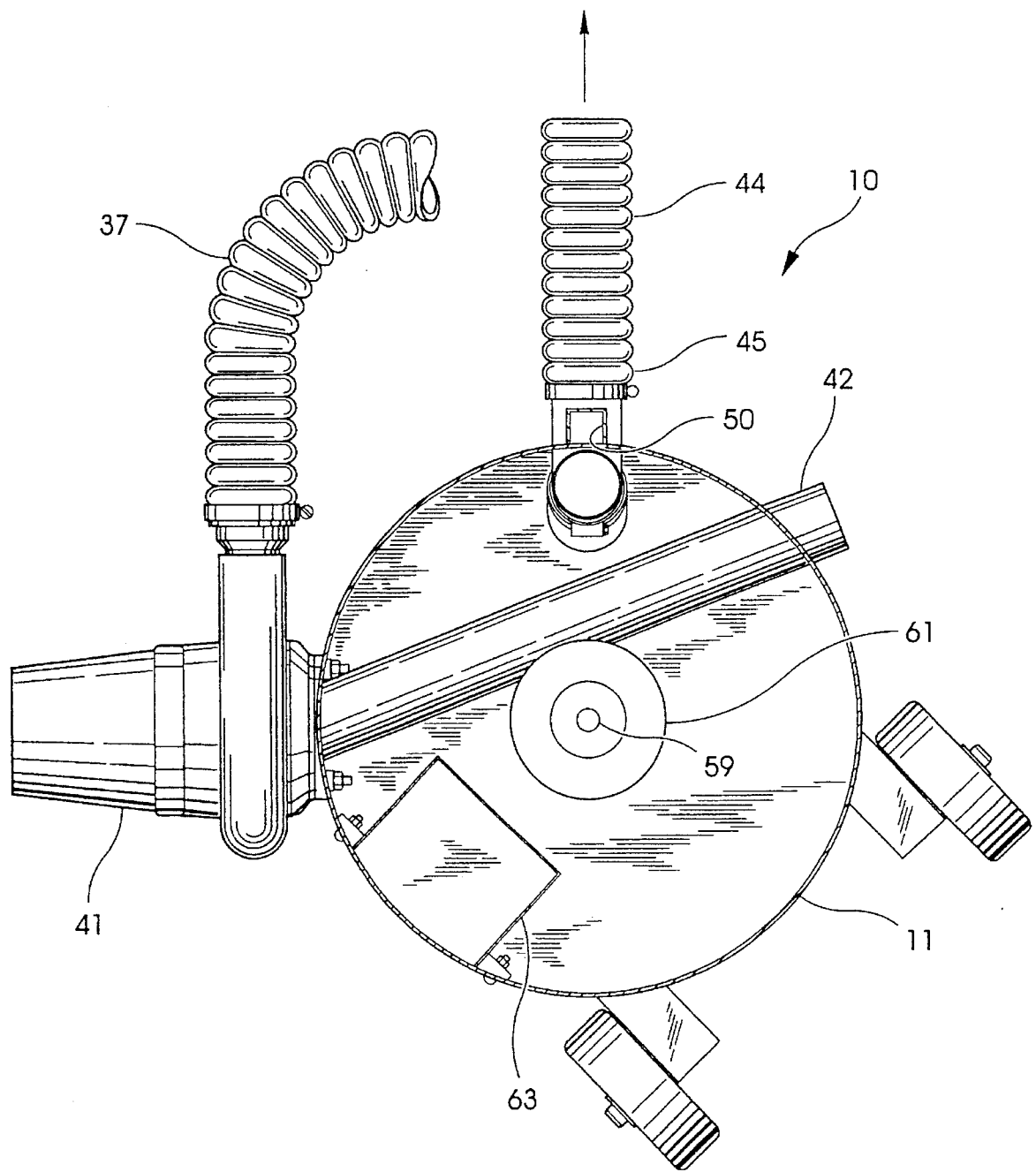
FIG. 4 is a sectioned top view of the thermal insulation blower of FIGS. 1–3 as viewed along the section arrows 4—4 of FIG. 3.

In order to add portability to the present invention, a pair of wheels 57 are attached to base frame 11 via a pair of brackets 58, as best shown in FIG. 2. Thus, insulation blower 10 has the ability to be easily moved from place to place by simply tilting the apparatus back upon wheels 57 and pushing it to a new location. Although not previously discussed, power is supplied to both blower 41 and gear motor 61 via an electrical control box 63 which is mounted in the lower portion of base frame 11 as shown in FIGS. 3 and 4.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermal insulation blower comprising:

a base frame;

a vertical axle;

a motor mounted on said frame and having a drive shaft attached to one end of said vertical axle;

a hopper sized to receive a bale of thermal insulation attached to said frame;

a rotating bale stripper positioned in said hopper and attached to said vertical axle;

a blower attached to said frame;

a rotating chamber wheel attached to said vertical axle beneath said rotating bale stripper, said wheel having a plurality of chambers distributed around said vertical axle that open upward toward said rotating bale stripper;

a stationary air lock attached to said frame and including upper and lower walls sized to enclose at least one of said plurality of chambers and further having a pair of openings;

a first conduit connecting said blower to one of said pair of openings of said air lock; and a second conduit having one end connected to the other of said pair of openings;

wherein said rotating bale stripper includes a stripper having a plurality of spoke members extending radially outward from said vertical axle and a center post feeder attached to said vertical axle above said stripper; and wherein said center post feeder is sized and shaped to bore upwardly through a bale of thermal insulation placed in said hopper when said vertical axle is rotating.

2. The thermal insulation blower of claim 1 further comprising means, attached to said hopper, for inhibiting rotation of a bale of thermal insulation received in said hopper.

3. The thermal insulation blower of claim 2 wherein a majority of said plurality of chambers are always open to receive pieces of thermal insulation when said rotating chamber wheel is rotated by said vertical axle.

4. The thermal insulation blower of claim 3 further comprising a clean air tube connecting said first conduit directly to said second conduit such that air can pass from said first conduit to said second conduit through both said air lock and said clean air tube.

5. The thermal insulation blower of claim 4 further comprising a rotating feed cone attached to said vertical axle between said rotating bale stripper and said rotating chamber wheel, and being sized and arranged to direct pieces of thermal insulation falling from said rotating bale stripper toward said plurality of chambers.

6. The thermal insulation blower of claim 1 wherein said plurality of spoke members are serrated.

7. The thermal insulation blower of claim 6 wherein said center post feeder is a bar attached to the other end of said vertical axle at an adjustable angle with respect to a horizontal reference line.

8. The thermal insulation blower of claim 6 wherein said serrated spoke members are spaced apart so as to define an opening between each adjacent pair of said serrated spoke members; and the thermal insulation blower further comprises a removable material block plate attachable to said rotating bale stripper and capable of blocking a portion of said opening between each adjacent pair of said serrated spoke members.

9. A thermal insulation blower comprising:

a base frame;

a vertical axle;

a motor mounted on said frame and having a drive shaft attached to one end of said vertical axle;

a hopper sized to receive a bale of thermal insulation attached to said frame;

a blower attached to said frame;

a rotating chamber wheel attached to said vertical axle, said wheel having a plurality of chambers distributed around said vertical axle that open upward to receive falling pieces of thermal insulation therein;

a stationary air lock attached to said frame and including upper and lower walls sized to enclose at least one of said plurality of chambers and further having a pair of openings;

means, positioned in said hopper above said rotating chamber wheel, for ripping a bail of thermal insulation into relatively small pieces and for metering the rate at which the small pieces are allowed to fall toward said rotating chamber wheel;

a first conduit connecting said blower to one of said pair of openings of said air lock; and a second conduit having one end connected to the other of said pair of openings.

10. The thermal insulation blower of claim 9 wherein said means for ripping and metering includes a plurality of serrated stripper members extending radially outward from said vertical axle, and further includes means for controlling the rate at which a bale of thermal insulation placed in said hopper is fed to said stripper wheel.

11. The thermal insulation blower of claim 10 wherein said means for controlling includes a center post feeder attached to said vertical axle above said stripper members; and wherein said center post feeder is sized and shaped to bore upwardly through a bale of thermal insulation placed in said hopper when said vertical axle is rotating.

12. The thermal insulation blower of claim 11 wherein said center post feeder is a bar attached crosswise to said vertical axle; and said means for controlling includes means for adjusting the angular orientation of said bar with respect to a horizontal reference line.

13. The thermal insulation blower of claim 11 further comprising a clean air tube connecting said first conduit directly to said second conduit such that air can pass from said first conduit to said second conduit through both said air lock and said clean air tube.

14. A thermal insulation blower comprising:

a base frame;

a hopper sized to receive a bale of thermal insulation attached to said frame;

a rotating bale stripper positioned in said hopper for ripping a bale of thermal insulation into relatively small pieces;

means, attached to said frame, for rotating said bale stripper;

a blower having a blower inlet and a blower outlet attached to said frame;

a rotating chamber wheel positioned within said frame beneath said rotating bale stripper, said wheel having a plurality of chambers distributed around its periphery for receiving pieces of thermal insulation therein;

means, attached to said housing, for rotating said chamber wheel;

a stationary air lock attached to said frame and having a pair of spaced apart walls sized to enclose at least one of said plurality of chambers and further having a pair of spaced apart openings for carrying out pieces of thermal insulation when one of said plurality of chambers is in registry with said stationary air lock;

a conduit;

a delivery hose; and wherein the thermal insulation blower has a first operating condition in which said conduit connects one of said pair of openings to said blower inlet, one end of said delivery hose is connected to said blower outlet and the other of said pair of openings is open to the atmosphere; and wherein the thermal insulation blower has a second operating condition in which said conduit connects the other of said pair of openings to said blower outlet, said one end of said delivery hose is connected to said one of said pair of openings and said blower inlet is open to the atmosphere.

15. The thermal insulation blower of claim 14 wherein said means for rotating said bale stripper and said means for rotating said chamber wheel is a motor mounted in said frame and having a drive shaft attached to one end of an axle, and both said bale stripper and said chamber wheel are attached to said axle.

16. The thermal insulation blower of claim 15 wherein said axle is vertical.

17. The thermal insulation blower of claim 16 wherein said rotating bale stripper includes a plurality of serrated stripper members extending radially outward from said vertical axle and a center post feeder attached to said vertical axle above said stripper members; and wherein said center post feeder is sized and shaped to bore upwardly through a bale of thermal insulation placed in said hopper when said vertical axle is rotating.

18. The thermal insulation blower of claim 17 wherein said center post feeder is a bar attached to the other end of said vertical axle at an adjustable angle with respect to a horizontal reference line.

19. The thermal insulation blower of claim 18 wherein said serrated stripper members are spaced apart so as to define an opening between each adjacent pair of serrated stripper members; and the thermal insulation blower further comprises a removable material block plate attachable to said rotating bale stripper and capable blocking a portion of said opening between each adjacent pair of said serrated stripper members.

20. The thermal insulation blower of claim 19 further comprising means for readily switching between said first operating condition and said second operating condition.

21. A thermal insulation blower comprising:

a base frame;

a vertical axle;

a motor mounted on said frame and having a drive shaft attached to one end of said vertical axle;

a hopper sized to receive a bale of thermal insulation attached to said frame;

a rotating bale stripper positioned in said hopper and attached to said vertical axle;

a blower attached to said frame;

a rotating chamber wheel attached to said vertical axle beneath said rotating bale stripper, said wheel having a plurality of chambers distributed around said vertical axle that open upward toward said rotating bale stripper;

a stationary air lock attached to said frame and including a plurality of walls sized to enclose at least one of said plurality of chambers and further having in said plurality of walls both a first opening and a second opening lower than said first opening;

a first conduit connecting said blower to said first opening of said air lock;

a second conduit having one end connected to said second opening; and a clean air tube connecting said first conduit directly to said second conduit such that air can pass from said first conduit to said second conduit through both said air lock and said clean air tube.

* * * * *

UNITED STATES PATENT AND TRADEMARK OFFICE
CERTIFICATE OF CORRECTION

PATENT NO. : 5,511,730

DATED : April 30, 1996

INVENTOR(S) : Michael W. Miller, Kerry W. Miller

It is certified that error appears in the above-identified patent and that said Letters Patent is hereby corrected as shown below:

In column 2, line 36, please change "tile" to —the—.
In column 2, line 37, please change "tile" to —the—.
In column 4, line 20, please change "tile" to —the—.

Signed and Sealed this

Sixth Day of August, 1996

Attest:

BRUCE LEHMAN

Attesting Officer

Commissioner of Patents and Trademarks